UNITED STATES PATENT OFFICE.

FELIX KLINGEMANN, OF MAINKUR, NEAR FRANKFORT-ON-THE-MAIN, GERMANY, ASSIGNOR TO CASSELLA COLOR COMPANY, A CORPORATION OF NEW YORK.

CLARET-RED TRISAZO DYESTUFF.

1,150,825.     Specification of Letters Patent.     Patented Aug. 17, 1915.

No Drawing.     Application filed October 8, 1914. Serial No. 865,763.

*To all whom it may concern:*

Be it known that I, FELIX KLINGEMANN, Ph. D., a subject of the King of Prussia, Germany, residing at Waldstrasse 27, Mainkur, near Frankfort-on-the-Main, Germany, have invented a new Claret - Red Trisazo Dyestuff, of which the following is a full description.

A new trisazo dyestuff may be made by coupling the tetrazo derivative of the compound

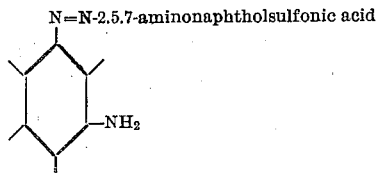

with two molecules of resorcin.

The new dyestuff dyes very fine claret red shades and possesses the valuable property of being fixed on the fiber by formaldehyde without a material change in shade. Dyeings thus aftertreated show an excellent fastness to washing and are readily dischargeable; they are also particularly well suited for the dyeing of union goods.

The process of manufacture is illustrated by the following example:

38 kilos of the sodium salt of m-aminophenylazo - 2.5.7 - aminonaphtholsulfonic acid, are tetrazotized with 70 kilos hydrochloric acid, and 14 kilos nitrite of soda.

The tetrazo compound is allowed to flow into a solution of 22.5 kilos resorcin, to which an excess of soda has been added. The dyestuff is separated from the warm solution by common salt, filtered and dried. The dyestuff is a dark powder soluble in concentrated sulfuric acid with a blue color. It corresponds to the formula

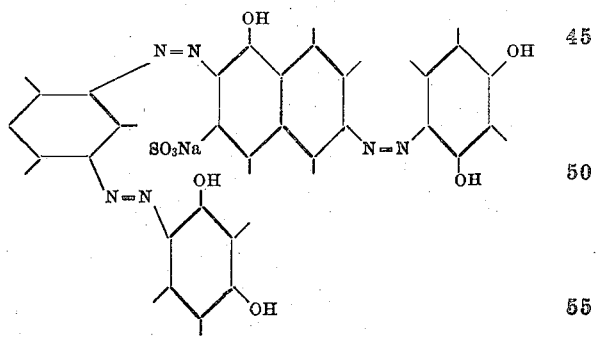

It yields upon treatment with stannous chlorid and hydrochloric acid meta-phenylenediamin, 2.6-diamino-5-hydroxy-naphthalene-7-sulfonic acid and 1 - amino - 2.4 - dihydroxy-benzene.

Having now particularly described and ascertained the nature of my said invention and in what manner the same is to be performed, I declare, that what I claim is:

The herein described new claret-red trisazo dyestuff having the formula

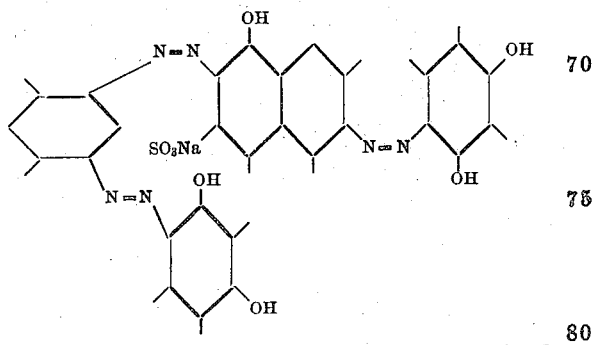

which is after being dried and pulverized in the shape of its alkaline salt a dark red powder soluble in hot water with a claret-red coloration, being soluble in concentrated sulfuric acid with a blue color, yielding upon treatment with stannous chlorid and hydrochloric acid meta-phenylenediamin, 2.6-diamino-5-hydroxy-naphthalene-7-sulfonic acid and 1-amino-2.4-dihydroxy-benzene, dyeing cotton in fine claret-red shades which are fast to washing after being treated with formaldehyde, substantially as described.

In witness whereof I have hereunto signed my name this 17th day of Sept. 1914, in the presence of two subscribing witnesses.

FELIX KLINGEMANN.

Witnesses:
JEAN GRUND,
CARL GRUND.